(12) United States Patent
Takano et al.

(10) Patent No.: US 11,014,510 B2
(45) Date of Patent: May 25, 2021

(54) CAMERA DEVICE

(71) Applicant: DENSO CORPORATION, Kariya (JP)

(72) Inventors: Shou Takano, Kariya (JP); Keigo Hikida, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/499,954

(22) PCT Filed: Mar. 13, 2018

(86) PCT No.: PCT/JP2018/009600
§ 371 (c)(1),
(2) Date: Oct. 1, 2019

(87) PCT Pub. No.: WO2018/203445
PCT Pub. Date: Nov. 8, 2018

(65) Prior Publication Data
US 2020/0262360 A1 Aug. 20, 2020

(30) Foreign Application Priority Data

May 1, 2017 (JP) .............................. JP2017-091282
Dec. 18, 2017 (JP) .............................. JP2017-242015

(51) Int. Cl.
*B60R 11/04* (2006.01)
*B60S 1/08* (2006.01)
*G03B 17/02* (2021.01)
*G03B 19/07* (2021.01)
*G06T 1/00* (2006.01)
(Continued)

(52) U.S. Cl.
CPC .............. *B60R 11/04* (2013.01); *B60S 1/0844* (2013.01); *G03B 17/02* (2013.01); *G03B 19/07* (2013.01); *G06T 1/00* (2013.01); *H04N 5/2257* (2013.01); *B60R 2011/0026* (2013.01)

(58) Field of Classification Search
None
See application file for complete search history.

(56) References Cited

U.S. PATENT DOCUMENTS 10,137,842 B2 * 11/2018 Mueller ............... G03B 19/023
2006/0157639 A1 * 7/2006 Shaffer ..................... G06T 5/50
250/208.1
2014/0300738 A1 10/2014 Mueller

FOREIGN PATENT DOCUMENTS

JP H10-261064 A 9/1998
JP 2013-095315 A 5/2013
(Continued)

OTHER PUBLICATIONS

May 15, 2018 International Search Report issued in International Application No. PCT/JP2018/009600.

*Primary Examiner* — Chikaodili E Anyikire
(74) *Attorney, Agent, or Firm* — Oliff PLC

(57) ABSTRACT

A camera device includes a windshield information detection camera and a vehicle exterior information detection camera. The windshield information detection camera captures an image to obtain information about a surface of a windshield. The vehicle exterior information detection camera captures an image to obtain information about the vehicle exterior. The windshield information detection camera and the vehicle exterior information detection camera are fixed to a vehicle in a state in which they are also fixed to each other.

10 Claims, 7 Drawing Sheets

(51) Int. Cl.
*H04N 5/225* (2006.01)
*B60R 11/00* (2006.01)

(56) References Cited

FOREIGN PATENT DOCUMENTS

| | | |
|---|---|---|
| JP | 2014-164461 A | 9/2014 |
| JP | 2016-218044 A | 12/2016 |

* cited by examiner

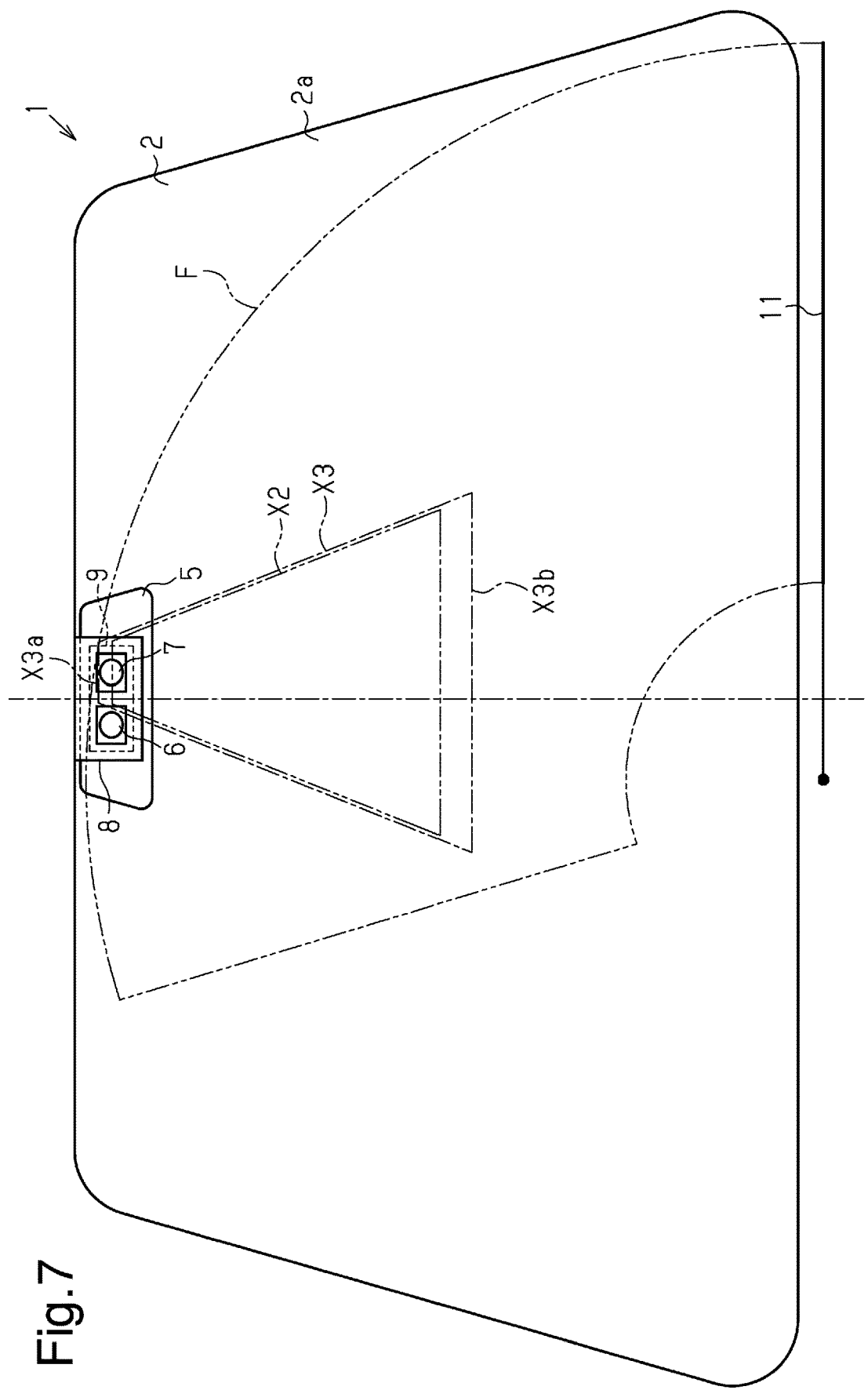

CAMERA DEVICE

TECHNICAL FIELD

The present disclosure relates to a camera device arranged in a vehicle.

BACKGROUND

A known camera (windshield information detection camera) arranged inside a vehicle captures an image of a windshield (vehicle exterior) to obtain information about the surface of the windshield such as whether foreign objects including raindrops are present on the windshield from the image (for example, refer to Patent Document 1).

Further, in recent years, a camera (vehicle exterior information detection camera) arranged inside a vehicle captures an image of the vehicle exterior (front of vehicle) through the windshield to obtain information about the vehicle exterior such as whether a pedestrian or the like are present in front of the vehicle from the image (for example, refer to Patent Document 2).

PRIOR ART LITERATURE

Patent Literature

Patent Document 1: Japanese Laid-Open Patent Publication No. 10-261064
Patent Document 2: Japanese Laid-Open Patent Publication No. 2014-164461

SUMMARY

Problem to be Solved by the Invention

When the above-mentioned windshield information detection camera and the vehicle exterior information detection camera are both arranged in a vehicle, it is difficult to install the cameras in the vehicle with a structure that separately fixes the windshield information detection camera and the vehicle exterior information detection camera to the vehicle.

One objective of the present disclosure is to provide a camera device that facilitates installation of a windshield information detection camera and a vehicle exterior information detection camera in a vehicle.

Means for Solving the Problem

In one general aspect, a camera device includes a windshield information detection camera and a vehicle exterior information detection camera. The windshield information detection camera captures an image to obtain information about a surface of a windshield. The vehicle exterior information detection camera captures an image to obtain information about the vehicle exterior. The windshield information detection camera and the vehicle exterior information detection camera are fixed to a vehicle in a state in which they are also fixed to each other.

BRIEF DESCRIPTION OF THE DRAWINGS

FIG. 7 is a schematic diagram of a windshield of a vehicle in accordance with another embodiment as viewed from the front of the vehicle.

DETAILED DESCRIPTION

One embodiment of a vehicle including a camera device will now be described with reference to FIGS. 1 to 5.

Figure 1:
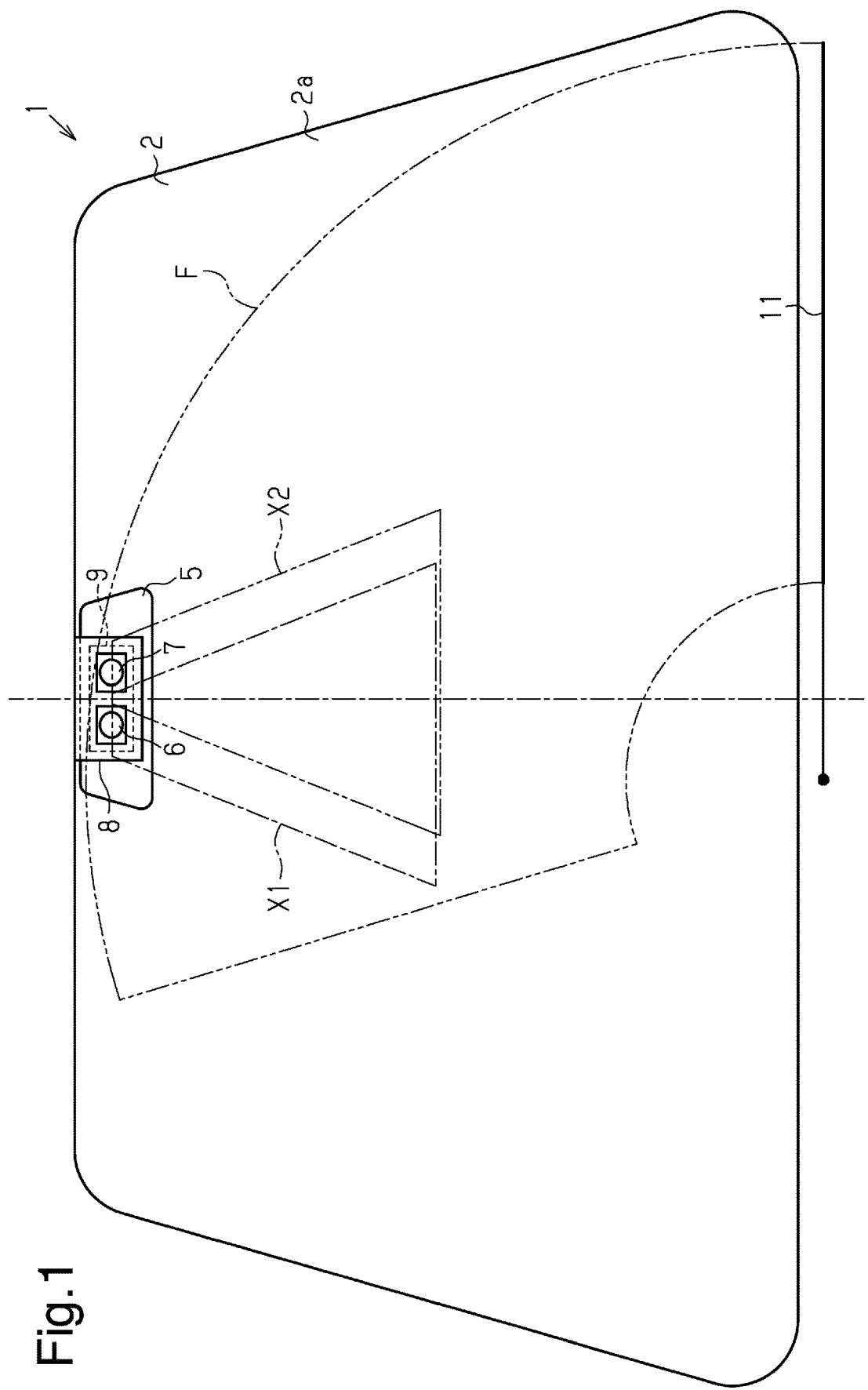
FIG. 1 is a schematic diagram of a windshield of a vehicle in accordance with one embodiment of the present disclosure as viewed from the front of the vehicle.
Figure 2:
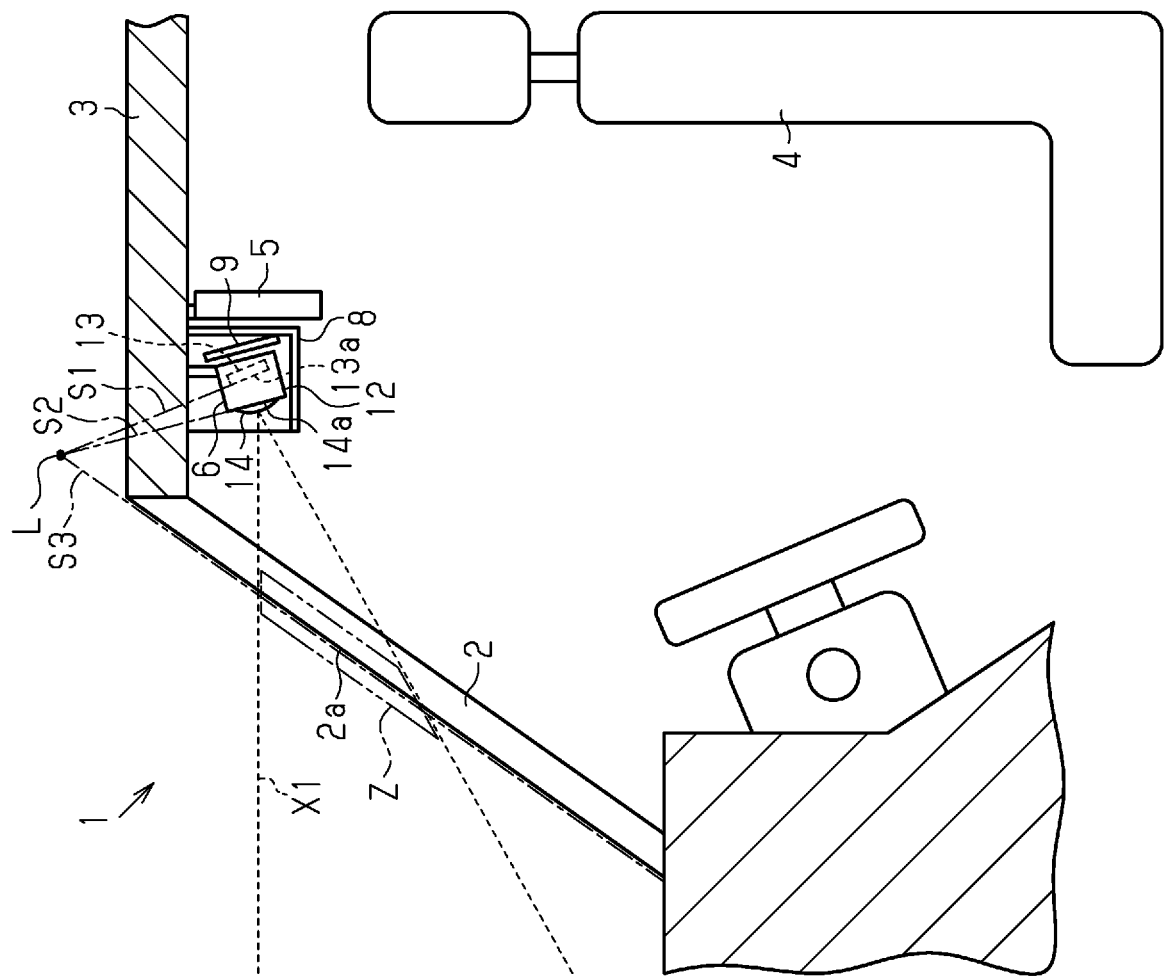
FIG. 2 is a schematic cross-sectional side view of the vehicle shown in FIG. 1.

As shown in FIGS. 1 and 2, a vehicle 1 includes a windshield 2. As shown in FIG. 2, the windshield 2 is arranged to extend diagonally downward toward the front of the vehicle from a vehicle front end of a roof panel 3. Further, a rearview mirror 5 is supported by a lower surface of the roof panel 3 in the vehicle 1 so that the rear can be checked from a driver seat 4.

As shown in FIG. 1, the vehicle 1 includes a raindrop/foreign object detection camera 6 and a periphery monitoring camera 7. The raindrop/foreign object detection camera 6 serves as a windshield information detection camera that captures an image to obtain information about the surface of the windshield 2. The periphery monitoring camera 7 serves as a vehicle exterior information detection camera that captures an image to obtain information about the vehicle exterior. The information about the surface of the windshield 2 in the present embodiment is information about positions where foreign objects including raindrops are present on an outer surface 2a of the windshield 2, and the information about the vehicle exterior is information about pedestrians, vehicles, traffic signs, and the like that are present in front of the vehicle 1. The raindrop/foreign object detection camera 6 and the periphery monitoring camera 7 of the present embodiment each capture an image every 0.1 seconds.

The raindrop/foreign object detection camera 6 and the periphery monitoring camera 7 are fixed to the vehicle 1 in a state in which they are fixed to each other (in a relatively immovable manner). Specifically, in the present embodiment, the raindrop/foreign object detection camera 6 and the periphery monitoring camera 7 are fixed to each other and accommodated in a single case 8. The case 8 is fixed to the vehicle 1. The case 8 in the present embodiment includes a fastening portion fixed to the roof panel 3 to be located toward the front of the vehicle from the rearview mirror 5. The rearview mirror 5 is located at the middle in a vehicle transverse direction of the vehicle 1, and the case 8 is also located at the middle in the vehicle transverse direction of the vehicle 1.

The case 8 accommodates a single circuit substrate 9 that recognizes the information about the surface of the windshield 2 based on an image captured by the raindrop/foreign object detection camera 6 and recognizes the information about the vehicle exterior based on an image captured by the periphery monitoring camera 7.

The raindrop/foreign object detection camera 6 and the periphery monitoring camera 7 are arranged next to each other in the vehicle transverse direction so that their image capturing ranges X1 and X2 partially overlap each other. FIG. 1 shows the image capturing ranges X1 and X2 on the windshield 2. The image capturing range X1 of the raindrop/foreign object detection camera 6 is shown by the single-dashed lines, and the image capturing range X2 of the periphery monitoring camera 7 is shown by the double-dashed lines. Further, the image capturing range X1 of the raindrop/foreign object detection camera 6 and the image capturing range X2 of the periphery monitoring camera 7 on the windshield 2 are arranged to be in a wiping range F of a wiper blade 11 of a wider device mounted on the vehicle 1.

The raindrop/foreign object detection camera 6 is set so that a focal point (focus) is on the outer surface 2a of the windshield 2. Specifically, the raindrop/foreign object detection camera 6 of the present embodiment includes a camera case 12, a CMOS (image) sensor 13, and a lens 14. The CMOS sensor 13 serves as an image capturing element that is accommodated and held in the camera case 12. The lens 14 is held to be exposed from the camera case 12 to the outside.

The CMOS sensor 13 includes an image capturing surface 13a and the lens 14 includes a main surface 14a. The image capturing surface 13a of the CMOS sensor 13 and the main surface 14a of the lens 14 are inclined relative to each other (in other words, nonparallel to each other) so that a plane including the image capturing surface 13a, a plane including the main surface 14a, and a plane including the outer surface 2a of the windshield 2 intersect on a straight line L. Although the outer surface 2a of the windshield 2 is not planar and actually curved, a plane that is the closest to the curved surface is used to set the inclinations of the image capturing surface 13a of the CMOS sensor 13 and the main surface 14a of the lens 14. Further, FIG. 2 is a schematic cross-sectional view taken from the side of the vehicle 1 (in vehicle transverse direction). The plane including the image capturing surface 13a is shown by a straight line S1, and the plane including the main surface 14a is shown by a straight line S2, and the plane including the outer surface 2a of the windshield 2 is shown by a straight line S3. The straight line L extends in a direction orthogonal to the plane of the drawing and is thus shown by a dot.

The periphery monitoring camera 7 is set so that the focal point will be in the background that is farther from the outer surface 2a of the windshield 2. The periphery monitoring camera 7 also includes a CMOS (image) sensor or a lens in the same manner as the raindrop/foreign object detection camera 6. However, the image capturing surface of the CMOS sensor and the main surface of the lens are arranged in parallel.

Figure 3:
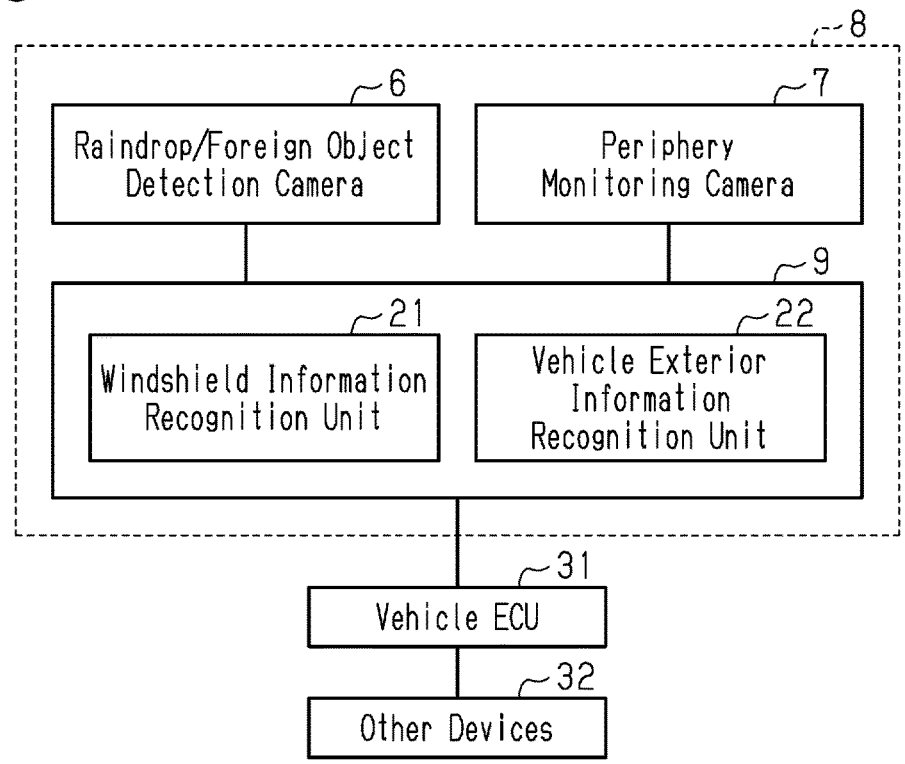
FIG. 3 is a block diagram of the vehicle shown in FIG. 1.

As shown in FIG. 3, the circuit substrate 9 includes various electric components such as a microcomputer and is configured as a windshield information recognition unit 21 and a vehicle exterior information recognition unit 22. The windshield information recognition unit 21 and the vehicle exterior information recognition unit 22 in the present embodiment are arranged in a single ECU. Specifically, the circuit substrate 9 includes an image processing ECU, and the image processing ECU is configured to execute processing as the windshield information recognition unit 21 and processing as the vehicle exterior information recognition unit 22.

The windshield information recognition unit 21 recognizes the information about the surface of the windshield 2 based on an image captured by the raindrop/foreign object detection camera 6. Specifically, the information about the surface of the windshield 2 recognized by the windshield information recognition unit 21 includes information about positions of foreign objects including raindrops in the image capturing range X1. In other words, the windshield information recognition unit 21 recognizes where foreign objects including raindrops are present in the image capturing range X1.

The vehicle exterior information recognition unit 22 recognizes the information about the vehicle exterior based on the information about the surface of the windshield 2 recognized by the windshield information recognition unit 21 and an image captured by the periphery monitoring camera 7. Specifically, the vehicle exterior information recognition unit 22 does not recognize the information about the vehicle exterior for positions that match the information about positions of foreign objects or recognize the information about the vehicle exterior (for example, lowers priority of information about vehicle exterior (from other information)) for positions that match the information about positions of foreign objects. In contrast, the vehicle exterior information recognition unit 22 recognizes the information about the vehicle exterior as being correct (for example, gives high priority) for positions that do not match the information about positions of foreign objects.

The circuit substrate 9 is electrically connected to a vehicle ECU 31, and the windshield information recognition unit 21 and the vehicle exterior information recognition unit 22 recognize and transmit the information about the surface of the windshield 2 or the information about the vehicle exterior to the vehicle ECU 31.

The vehicle ECU 31 is electrically connected to other devices 32, which may be of various types such as a wiper device and a brake device, and actuates the other devices 32 in accordance with various types of received information.

Figure 4:
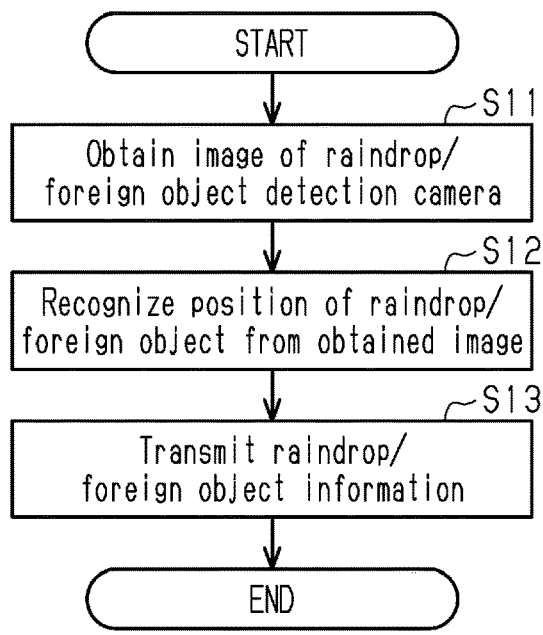
FIG. 4 is a flowchart illustrating a process of a windshield information recognition unit shown in FIG. 3.

Specifically, as illustrated in FIG. 4, the windshield information recognition unit 21 performs processing from step S11 upon completion of image capturing by the raindrop/foreign object detection camera 6.

In step S11, the windshield information recognition unit 21 obtains the captured image from the raindrop/foreign object detection camera 6 and proceeds to step S12.

In step S12, the windshield information recognition unit 21 recognizes the information about the surface of the windshield 2, which is the information about positions of foreign objects including raindrops, based on the obtained image and proceeds to step S13. That is, here, the windshield information recognition unit 21 divides the image into small regions and sequentially determines whether foreign objects such as raindrops are in the regions. Further, the windshield information recognition unit 21 changes the size of the regions and sequentially determines again whether foreign objects such as raindrops are in the regions to specify the positions (regions) where the foreign objects are present.

In step S13, the windshield information recognition unit 21 transmits the recognized information about the surface of the windshield 2 (information about positions where foreign objects are present) to the vehicle exterior information recognition unit 22 and the vehicle ECU 31 and then ends the process.

Then, for example, if the vehicle ECU 31 in the present embodiment determines that the amount of the raindrops is greater than or equal to a preset amount based on the information about the surface of the windshield 2 from the windshield information recognition unit 21, the vehicle ECU 31 actuates the wiper device, which is one of the other devices 32.

Figure 5:
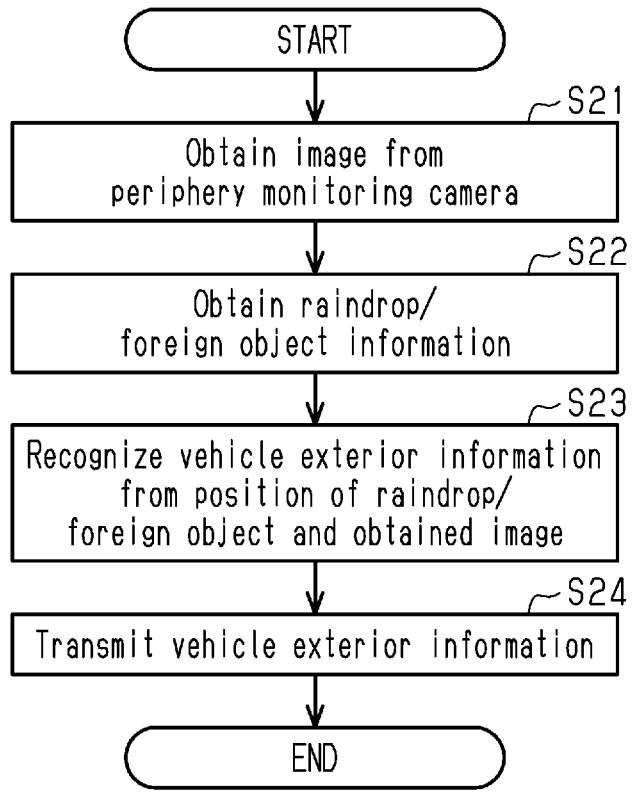
FIG. 5 is a flowchart illustrating a process of a vehicle exterior information recognition unit shown in FIG. 3.

As illustrated in FIG. 5, the vehicle exterior information recognition unit 22 executes processing from step S21 upon completion of image capturing by the periphery monitoring camera 7.

In step S21, the vehicle exterior information recognition unit 22 obtains the captured image from the periphery monitoring camera 7 and proceeds to step S22.

In step S22, the vehicle exterior information recognition unit 22 obtains the information about positions of foreign objects including raindrops, which is the information about the surface of the windshield 2 recognized by the windshield information recognition unit 21, and proceeds to step S23.

In step S23, the vehicle exterior information recognition unit 22 recognizes the information about the vehicle exterior (information about pedestrians, vehicles, traffic signs, and the like) based on the information about the surface of the windshield 2 (information about positions of foreign objects such as raindrops) and the obtained image (image captured by periphery monitoring camera 7) and then proceeds to step S24. That is, here, the vehicle exterior information recognition unit 22 divides the image captured by the periphery monitoring camera 7 into small regions and sequentially determines what is present in the regions (whether pedestrians, vehicles, traffic signs, and the like are present) and the like. Further, the vehicle exterior information recognition unit 22 changes the size of the regions and sequentially determines again what is present in the regions (whether pedestrians, vehicles, traffic signs, and the like are present) and the like. In this case, the vehicle exterior information recognition unit 22 does not recognize the information about the vehicle exterior for positions that match the information about positions of foreign objects or recognize the information about the vehicle exterior (for example, lowers priority of information about the vehicle exterior (from other information)) for positions that match the information about positions of foreign objects. In contrast, the vehicle exterior information recognition unit 22 recognizes the information about the vehicle exterior as being correct (for example, gives high priority) for positions that do not match the information about positions of foreign objects.

In step S24, the vehicle exterior information recognition unit 22 transmits the recognized information about the vehicle exterior (information about pedestrians, vehicles, traffic signs, and the like) to the vehicle ECU 31 and ends the process.

Then, for example, if the vehicle ECU 31 in the present embodiment determines that it is necessary to decrease the vehicle speed based on the information about the vehicle exterior from the vehicle exterior information recognition unit 22, the vehicle ECU 31 actuates the brake device, which is one of the other devices 32.

The operation of the above embodiment (camera device) will now be described.

For example, when the vehicle is traveling, the raindrop/foreign object detection camera 6 and the periphery monitoring camera 7 each capture an image every 0.1 seconds, and the information about the surface of the windshield 2 and the information about the vehicle exterior are recognized whenever an image is captured.

Figure 6A:
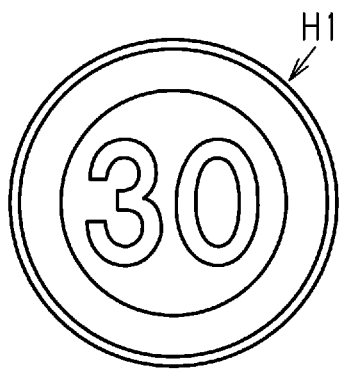
FIGS. 6A and 6B are schematic diagrams showing examples of captured images.

For example, in the overlapping image capturing ranges X1 and X2, for example, if an image of a traffic sign H1 such as that shown in FIG. 6A is included in a portion of the image captured by the periphery monitoring camera 7 and the windshield information recognition unit 21 does not determine that foreign objects are present at that position, the vehicle exterior information recognition unit 22 recognizes the information about the vehicle exterior at that position as being correct (for example, gives highly priority).

Figure 6B:
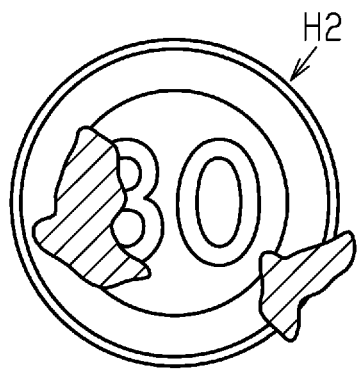

Further, in the overlapping image capturing ranges X1 and X2, for example, if an image of a traffic sign H2 (partially indiscernible because of raindrops) such as that shown in FIG. 6B is included in a portion of the image captured by the periphery monitoring camera 7 and the windshield information recognition unit 21 determines that foreign objects are present at that position, the vehicle exterior information recognition unit 22 does not recognize the information about the vehicle exterior or recognizes the information about the vehicle exterior at that position where the foreign objects are present (for example, gives lower priority).

The above embodiment has the following advantages.

(1) The raindrop/foreign object detection camera 6 and the periphery monitoring camera 7 are fixed to the vehicle 1 in a state in which they are fixed to each other. For example, this facilitates installation of the raindrop/foreign object detection camera 6 and the periphery monitoring camera 7 in the vehicle 1 compared to when separately fixing the cameras to the vehicle 1.

(2) The camera device includes a single case 8 that accommodates the raindrop/foreign object detection camera 6 and the periphery monitoring camera 7, in a state in which they are fixed to each other, and the case 8 is fixed to the vehicle 1. For example, this improves the aesthetic appeal of the camera device compared to when the same case 8 is not used.

(3) The camera device includes a single circuit substrate 9 that recognizes the information about the surface of the windshield 2 based on an image captured by the raindrop/foreign object detection camera 6 and recognizes the information about the vehicle exterior based on an image captured by the periphery monitoring camera 7. This reduces the number of parts of the camera device compared to when each type of recognition is performed by a different circuit substrate.

(4) The raindrop/foreign object detection camera 6 and the periphery monitoring camera 7 are fixed so that the image capturing ranges X1 and X2 partially overlap each other. This allows information to be obtained from two images in the overlapping the image capturing ranges X1 and X2. Thus, in the present embodiment, the information about the surface of the windshield 2 can be recognized based on an image captured by the raindrop/foreign object detection camera 6, and the information about the vehicle exterior can be accurately recognized based on the information about the surface of the windshield 2 and an image captured by the periphery monitoring camera 7. That is, an image captured by the raindrop/foreign object detection camera 6 is an image of which the focal point is on the outer surface 2a of the windshield 2, and an image captured by the periphery monitoring camera 7 is an image of which the focal point is not on the outer surface of the windshield 2 (focal point in background). Since it is difficult to recognize foreign objects including raindrops on the windshield 2 based on only an image captured by the periphery monitoring camera 7, the information about the vehicle exterior may be erroneously recognized. However, the use of the information about the surface of the windshield 2 based on an image captured by the raindrop/foreign object detection camera 6 avoids erroneous recognition. Further, the raindrop/foreign object detection camera 6 and the periphery monitoring camera 7 are configured to be fixed to the vehicle 1 in a state in which they are fixed to each other. This limits displacement of the raindrop/foreign object detection camera 6 and the periphery monitoring camera 7, that is, the image capturing ranges X1 and X2, from the preset positions as compared with when the raindrop/foreign object detection camera 6 and the periphery monitoring camera 7 are separately fixed to the vehicle 1. Thus, the information about the vehicle exterior can be recognized more accurately.

(5) The image capturing range X1 of the raindrop/foreign object detection camera 6 and the image capturing range X2 of the periphery monitoring camera 7 on the windshield 2 are arranged in the wiping range F of the wiper blade 11 of the wiper device mounted on the vehicle 1. Thus, foreign objects in the image capturing ranges X1 and X2 on the windshield 2 can be wiped by the wiper blade 11.

(6) The image capturing surface 13$a$ of the CMOS sensor 13 and the main surface 14$a$ of the lens 14 of the raindrop/foreign object detection camera 6 are arranged nonparallel to each other so that the plane including the image capturing surface 13$a$, the plane including the main surface 14$a$, and the plane including the outer surface 2$a$ of the windshield 2 intersect on the straight line L. Thus, according to the Scheimpflug principle, the focal point (focus) can be in a wide range Z extending along the outer surface 2$a$ of the windshield. FIG. 2 schematically shows the focus range Z with double-dashed lines. Thus, an obtained image focused on the outer surface 2$a$ of the windshield 2 and not focused on the background (blurred background). This allows the information about the surface of the windshield 2 to be accurately recognized from the image.

(7) The raindrop/foreign object detection camera 6 and the periphery monitoring camera 7 are fixed to the vehicle 1 to be located toward the front of the vehicle from the rearview mirror 5. This does not obstruct the field of view of the vehicle occupant.

The above embodiment may be modified as follows.

In the above embodiment, the camera device includes a single case 8 that accommodates the raindrop/foreign object detection camera 6 and the periphery monitoring camera 7 in a state in which they are fixed to each other. Instead, for example, the camera device does not have to include the case 8 and the raindrop/foreign object detection camera 6 and the periphery monitoring camera 7 may be fixed to the vehicle 1 in a state in which they are directly fixed to each other.

In the above embodiment, the camera device includes a single circuit substrate 9 that recognizes the information about the surface of the windshield 2 based on an image captured by the raindrop/foreign object detection camera 6 and recognizes the information about the vehicle exterior based on an image captured by the periphery monitoring camera 7. Instead, the camera device may have each type of recognition perform with a different circuit substrate. That is, a circuit substrate that includes the windshield information recognition unit 21 may be a separate from a circuit substrate that includes the vehicle exterior information recognition unit 22. Further, in the above embodiment, the windshield information recognition unit 21 and the vehicle exterior information recognition unit 22 are provided in a single ECU. Instead, the windshield information recognition unit 21 and the vehicle exterior information recognition unit 22 may be provided in different ECUs (IC chips).

In the above embodiment, the raindrop/foreign object detection camera 6 and the periphery monitoring camera 7 are fixed so that the image capturing ranges X1 and X2 partially overlap each other. Instead, the raindrop/foreign object detection camera 6 and the periphery monitoring camera 7 may be fixed so that the image capturing ranges X1 and X2 entirely overlap each other or so that the image capturing ranges X1 and X2 do not overlap each other.

Figure 8:
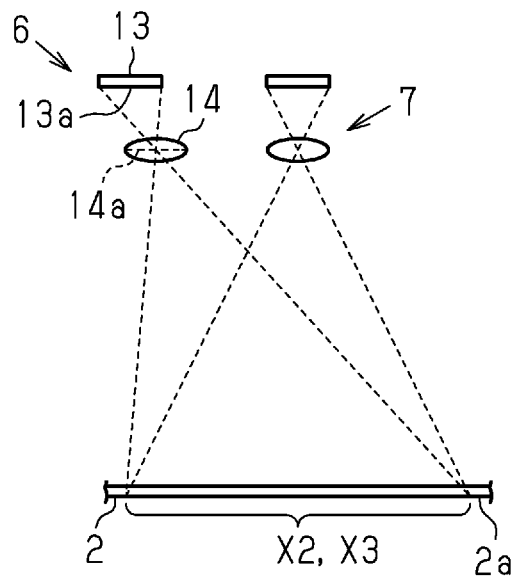
FIG. 8 is a schematic diagram of the vehicle shown in FIG. 7 as viewed from above the vehicle.

For example, as shown in FIGS. 7 and 8, an image capturing range X3 of the raindrop/foreign object detection camera 6 may entirely include the image capturing range X2 of the periphery monitoring camera 7 on the windshield 2.

In this example, as shown in FIG. 8, when viewed from above, the raindrop/foreign object detection camera 6 is shifted away from the periphery monitoring camera 7 (leftward in FIG. 8) so that the CMOS sensor 13 (image capturing surface 13$a$) does not directly oppose the lens 14 (main surface 14$a$). In this manner, the image capturing range X3 is set to include the entire image capturing range X2.

Accordingly, the information about the vehicle exterior can be accurately recognized from the entire image capturing range X2 of the periphery monitoring camera 7. This allows for accurate recognition of the information about the vehicle exterior in the entire image capturing range X2. If the image capturing ranges X1 and X2 only partially overlap each other like in the above embodiment, the information about the vehicle exterior is accurately recognized only in the overlapping range.

Further, in this example (refer to FIG. 7), the image capturing range X3 of the raindrop/foreign object detection camera 6 is set to include an upper range X3$a$, which is located upward from the image capturing range X2 of the periphery monitoring camera 7 on the windshield 2, and a lower range X3$b$, which is located downward from the image capturing range X2 of the periphery monitoring camera 7 on the windshield 2.

In this case, for example, when foreign objects such as raindrops are present in at least one of the upper range X3$a$ and the lower range X3$b$ of the image capturing range X2 of the periphery monitoring camera 7 on the windshield 2, the wiper device will be automatically actuated so that the foreign objects will not be forced into the image capturing range X2 of the periphery monitoring camera 7 by gravity or air currents. Specifically, when foreign objects such as raindrops are present in the upper range X3$a$ of the image capturing range X2, the wiper device will be automatically actuated so that the foreign objects will not be forced into the image capturing range X2 of the periphery monitoring camera 7 by gravity. Further, when foreign objects such as raindrops are present in the lower range X3$b$ of the image capturing range X2, the wiper device will be automatically actuated so that the foreign objects are not forced into the image capturing range X2 of the periphery monitoring camera 7 by air currents. This increases the probability of the vehicle exterior information recognition unit 22 obtaining correct (for example, gives high priority) information about the vehicle exterior so that the information can be used in a preferred manner.

Figure 9:
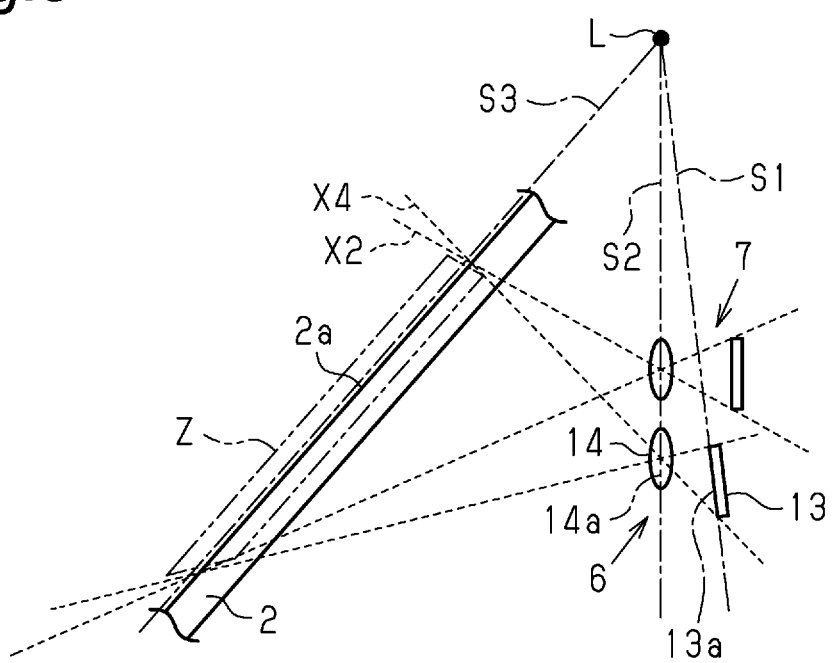
FIG. 9 is a schematic diagram of the vehicle in accordance with a further embodiment as viewed from beside the vehicle.
Figure 10:
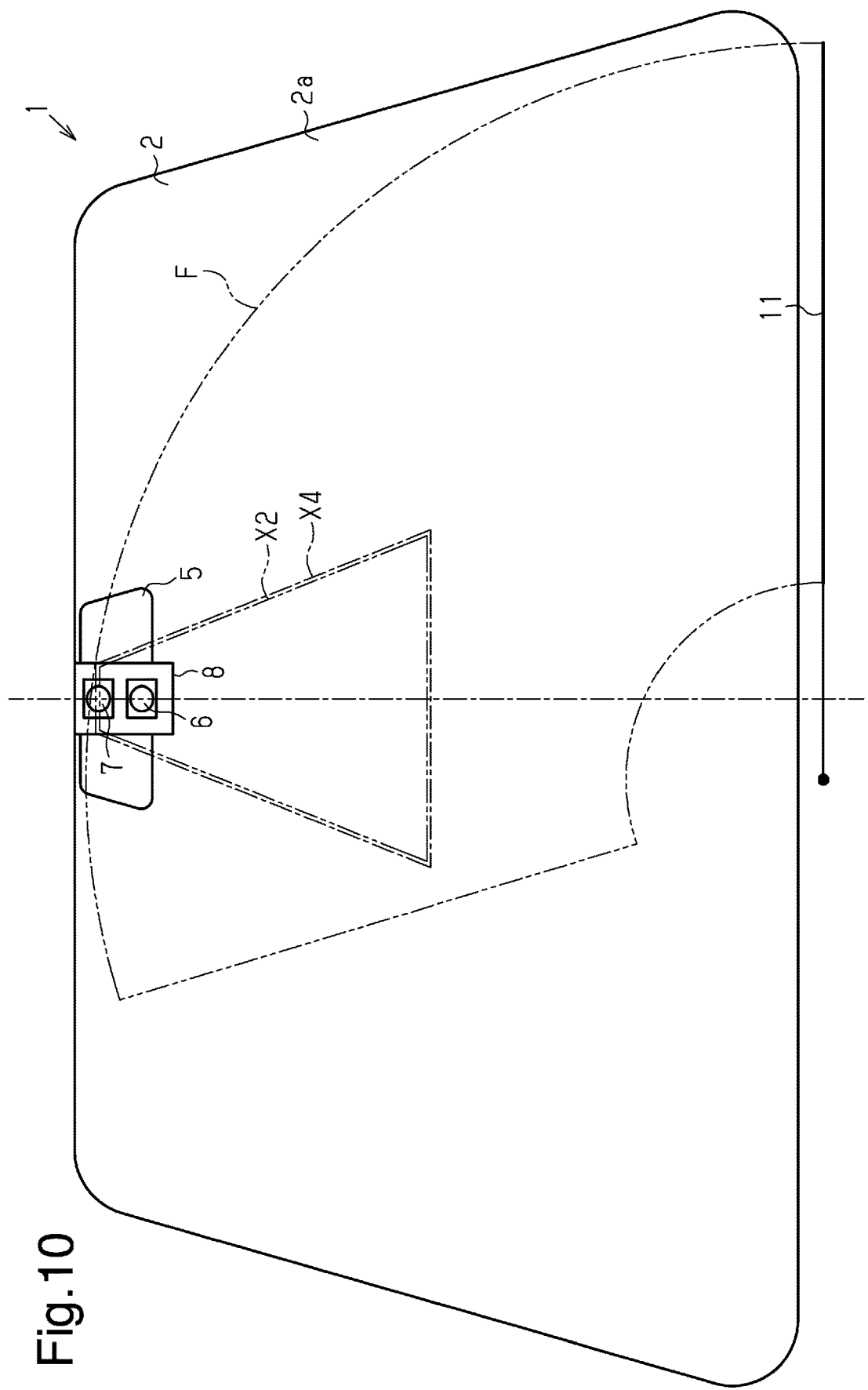
FIG. 10 is a schematic diagram of the windshield of the vehicle shown in FIG. 9 as viewed from the front of the vehicle.

Further, for example, as shown in FIGS. 9 and 10, an image capturing range X4 of the raindrop/foreign object detection camera 6 may be set to include the entire image capturing range X2 of the periphery monitoring camera 7 on the windshield 2. In this example, the raindrop/foreign object detection camera 6 and the periphery monitoring camera 7 are arranged next to each other in a vertical direction (gravity direction). Specifically, in this example, the raindrop/foreign object detection camera 6 is located below the periphery monitoring camera 7.

Moreover, in this example, as shown in FIG. 9, when viewed from the side, the raindrop/foreign object detection camera 6 is shifted away from the periphery monitoring camera 7 (downward in FIG. 9) so that the CMOS sensor 13 (image capturing surface 13a) does not directly oppose the lens 14 (main surface 14a). In this manner, the image capturing range X4 is set to include the entire image capturing range X2. Also, in this example, the focal point (focus) of the raindrop/foreign object detection camera 6 is in the wide range Z, which extends along the outer surface 2a of the windshield 2, according to the Scheimpflug principle.

In this case, the information about the vehicle exterior is also accurately recognized in the entire the image capturing range X2 of the periphery monitoring camera 7. That is, the information about the vehicle exterior is accurately recognized in the entire image capturing range X2. If the image capturing ranges X1 and X2 only partially overlap each other like in the above embodiment, the information about the vehicle exterior is accurately recognized only in the overlapping range.

In the above embodiment, the image capturing range X1 of the raindrop/foreign object detection camera 6 and the image capturing range X2 of the periphery monitoring camera 7 on the windshield 2 are arranged in the wiping range F of the wiper blade 11 of the wiper device mounted on the vehicle 1. Instead, the image capturing range X1 of the raindrop/foreign object detection camera 6 and the image capturing range X2 of the periphery monitoring camera 7 on the windshield 2 may be arranged outside the wiping range F.

In the above embodiment, the image capturing surface 13a of the CMOS sensor 13 and the main surface 14a of the lens 14 of the raindrop/foreign object detection camera 6 are arranged to be nonparallel to each other. Instead, the image capturing surface 13a of the CMOS sensor 13 and the main surface 14a of the lens 14 of the raindrop/foreign object detection camera 6 may be arranged in parallel. That is, the raindrop/foreign object detection camera 6 may be configured not to use the above-mentioned Scheimpflug principle. In this case, the image capturing surface 13a of the CMOS sensor 13, the main surface 14a of the lens 14, and the outer surface 2a of the windshield 2 may be arranged in parallel.

In the above embodiment, the illustrated raindrop/foreign object detection camera 6 includes only the lens 14 that is simply exposed to the outside. Instead, the raindrop/foreign object detection camera 6 may also include a lens inside the camera case 12, and the lenses (main surfaces) and the image capturing surface 13a may be inclined to be focused in the wide range Z, which extends along the outer surface 2a of the windshield 2, according to the Scheimpflug principle.

In the above embodiment, the case 8 accommodating the raindrop/foreign object detection camera 6 and the periphery monitoring camera 7 is fixed to the vehicle 1 toward the front of the vehicle from the rearview mirror 5. Instead, the case 8 may be fixed at a position separated from the front side of the rearview mirror 5. Further, in the above embodiment, the case 8 is fixed to the roof panel 3. However, the case 8 may be fixed to the windshield 2.

In the above embodiment, the case 8 accommodates the circuit substrate 9, the circuit substrate 9 includes the windshield information recognition unit 21 and the vehicle exterior information recognition unit 22, the windshield information recognition unit 21 and the vehicle exterior information recognition unit 22 transmit recognized information to the vehicle ECU 31, and the vehicle ECU 31 operates the other devices 32. However, the configuration is not limited in such a manner and may be changed. For example, the circuit substrate 9 may be provided outside the case 8. Further, for example, the circuit substrate 9 may include a controller for directly actuating the other devices 32 (without vehicle ECU 31) based on the information about the surface of the windshield 2 or the information about the vehicle exterior.

What is claimed is:

1. A camera device, comprising:
a windshield information detection camera that captures an image to obtain information about a windshield; and
a vehicle exterior information detection camera that captures an image to obtain information about vehicle exterior, wherein:
the windshield information detection camera and the vehicle exterior information detection camera are fixed to a vehicle in a state in which the windshield information detection camera and the vehicle exterior information detection camera are fixed to each other,
the windshield information detection camera and the vehicle exterior information detection camera are arranged next to each other in a vehicle transverse direction,
the windshield information detection camera includes an image capturing element and a lens,
an image capturing surface of the image capturing element and a main surface of the lens are arranged nonparallel to each other so that a plane including the image capturing surface, a plane including the main surface, and a plane including an outer surface of the windshield intersect on a straight line, and
when viewed from above, the image capturing element of the windshield information detection camera is shifted away from the vehicle exterior information detection camera so that the image capturing surface of the image capturing element of the windshield information detection camera does not fully oppose the main surface of the lens of the windshield information detection camera.

2. The camera device according to claim 1, further comprising:
a single case that accommodates the windshield information detection camera and the vehicle exterior information detection camera in a state in which the windshield information detection camera and the vehicle exterior information detection camera are fixed to each other, wherein the case is fixed to the vehicle.

3. The camera device according to claim 1, further comprising a single circuit substrate that recognizes the information about the windshield based on an image captured by the windshield information detection camera and recognizes the information about the vehicle exterior based on an image captured by the vehicle exterior information detection camera.

4. The camera device according to claim 1, wherein the windshield information detection camera and the vehicle exterior information detection camera are fixed so that their image capturing ranges at least partially overlap each other.

5. The camera device according to claim 4, wherein the image capturing range of the windshield information detection camera is set to entirely include the image capturing range of the vehicle exterior information detection camera on the windshield.

6. The camera device according to claim 1, wherein an image capturing range of the windshield information detection camera and an image capturing range of the vehicle exterior information detection camera on the windshield are arranged in a wiping area of a wiper blade.

7. The camera device according to claim 6, wherein the image capturing range of windshield information detection camera is set to include at least one of a range located upward from the image capturing range of the vehicle exterior information detection camera on the windshield and a range located downward from the image capturing range of the vehicle exterior information detection camera on the windshield.

8. The camera device according to claim 1, wherein the windshield information detection camera and the vehicle exterior information detection camera are fixed to the vehicle toward the front of the vehicle from a rearview mirror.

9. The camera device according to claim 6, wherein the image capturing range of the windshield information detection camera is set to include a range located downward from the image capturing range of the vehicle exterior information detection camera on the windshield.

10. The camera device according to claim 1, wherein
when viewed from a side, the image capturing element of the windshield information detection camera is shifted away from the vehicle exterior information detection camera so that the image capturing surface of image capturing element of the windshield information detection camera does not fully oppose the main surface of the lens of the windshield information detection camera.

* * * * *